United States Patent [19]

Carroll

[11] Patent Number: 5,107,882

[45] Date of Patent: Apr. 28, 1992

[54] VALVE ASSEMBLY WITH REMOVABLE PACKING

[75] Inventor: James L. Carroll, Long Beach, N.C.

[73] Assignee: John M. Hefner, Aurora, Colo.; a part interest

[21] Appl. No.: 736,216

[22] Filed: Jul. 26, 1991

[51] Int. Cl.⁵ .................... F16K 11/04; F16K 43/00
[52] U.S. Cl. ................... 137/327; 29/235; 29/264; 29/282; 81/8.1; 137/315; 251/214; 277/9
[58] Field of Search ............... 29/235, 264, 282, 283; 81/8.1; 137/315, 327; 251/214, 264, 266, 267; 277/9

[56] References Cited

U.S. PATENT DOCUMENTS

| | | | |
|---|---|---|---|
| 2,809,059 | 10/1957 | Hillis | 137/315 |
| 3,654,686 | 4/1972 | McFarland et al. | 29/282 |
| 4,330,917 | 5/1982 | Dzurkovich | 29/264 |
| 4,351,512 | 9/1982 | Siver | 137/315 |
| 4,356,832 | 11/1982 | Velan | 137/315 |
| 4,394,872 | 7/1983 | Schobl | 137/315 |
| 4,944,081 | 7/1990 | Ross | 29/235 |

Primary Examiner—George L. Walton
Attorney, Agent, or Firm—Rhodes, Coats & Bennett

[57] ABSTRACT

A valve assembly includes a self-contained, packing removal means for removing the valve packing. The valve assembly includes a valve stem connected at one end to a valve, a bonnet for mounting the valve stem on a valve body having a valve seat engageable with said valve on said valve stem, and means for raising and lowering said valve stem to selectively open and close said valve. The bonnet includes a packing chamber through which an intermediate portion of the valve stem extends. The packing removal means comprises a radially displaceable lifting element disposed within the valve stem and movable to an extended position where it engages the packing assembly from underneath upon operation of the valve stem to lift the valve packing from the packing chamber.

17 Claims, 3 Drawing Sheets

VALVE ASSEMBLY WITH REMOVABLE PACKING

FIELD OF THE INVENTION

The present invention relates generally to a valve assembly and is particularly concerned with means for removing the valve packing from the valve assembly for replacement.

BACKGROUND OF THE INVENTION

A typical valve assembly includes a valve body having a conical valve seat engaged with a valve secured on one end of a valve stem. The valve stem extends upwardly through a bonnet. The bonnet includes cylindrical chamber through which an intermediate portion of the valve stem extends. A valve packing is inserted into the cylindrical chamber and surrounds the valve stem to prevent fluid from leaking around the valve stem. The valve packing should be periodically replaced as part of a preventive maintenance program to assure that the valve remains in good working order.

Replacement of the valve packing is, generally speaking, a tedious and time consuming process. The valve packing usually becomes compressed and hardened when the valve has been used. Accordingly, it is often necessary to use picks, screw drivers, scrapers, wire brushes and similar instruments to remove the valve packing that are likely to scratch or damage the highly polished surfaces of the packing chamber and valve stem. Damage to those surfaces may result in the failure of the packing to provide a complete seal around the valve stem. If severe enough, damage could require replacement of the entire valve assembly.

In the past, various types of valve assemblies have been designed which include selfcontained means for removing the valve packing. For example, U.S. Pat. No. 2,809,059 discloses a valve assembly having a collar mounted in the packing chamber immediately below the valve packing. The collar includes a threaded bore which aligns with threaded bores in both the valve stem and the bonnet. In normal use, a set screw is threadably engaged in the bores formed in the housing and the collar to lock the collar in place. Thus, the collar will not move when the valve stem is rotated. When it is desired to remove the valve packing, the bore in the valve stem is aligned with the bore in the collar, and the set screw is positioned to partially engage the bores in the stem and the collar respectively. Thus, when the valve stem is rotated, the collar will move with the valve stem and lift the packing from the packing chamber. One disadvantage with this valve assembly resides in the difficulty with aligning the threaded bores in the various components. Another disadvantage is that it requires a specially designed bonnet and therefore cannot be used with existing valve assemblies which are already in place.

U.S. Pat. No. 4,394,872 discloses a valve assembly having a drive bushing mounted in the bonnet chamber below the bottom of the valve packing. A collar is integrally formed on the valve stem and is normally disposed below the drive bushing. To remove the packing, the valve stem is rotated counterclockwise to bring the collar on the valve stem into forceful engagement with the drive bushing. Continued rotation of the stem forces the packing upwardly and out of the packing chamber. This design for a valve assembly also requires a specially constructed bonnet to provide clearance for the stem collar.

SUMMARY AND OBJECTS OF THE INVENTION

The present invention is a valve assembly having a self-contained packing removal means. The packing removal means can be incorporated into any existing valve assembly by making modifications to the valve stem. No modification of the valve body, or bonnet is required.

The valve assembly includes a valve body defining a fluid chamber. The fluid chamber is separated by a partition into an upstream compartment and a downstream compartment. An opening is formed in the partition which permits fluid to flow between the upstream compartment and the downstream compartment. A valve seat is formed in the partition and is engageable by a valve to open and close the valve. The valve is mounted on a valve stem which is movable along its axis. The upper end of the valve stem is threadably engaged with a crank. The valve stem can be raised and lowered by turning the crank clockwise and counterclockwise. A bonnet is mounted on the valve body and includes a packing chamber through which an intermediate portion of the valve stem extends. A removable packing assembly is disposed in the packing chamber. The packing assembly includes a valve packing which is disposed around the valve stem to prevent fluid leakage around the valve stem. A lifting ring is also disposed in the packing chamber below the valve packing. To remove the packing assembly, the lifting ring is engaged from below by a lifting element while the valve stem is being raised to lift the packing upwardly out of the packing chamber. The lifting element is disposed in a transverse bore in an intermediate portion of the valve stem, and is normally disposed in a retracted position. An actuator moves the lifting element ot an extended position where it can engage the lifting ring to affect removal of the valve packing.

Accordingly, it is an object of the present invention to provide a valve assembly having a packing removal means for removing the valve packing from valve assembly.

Another object of the present invention is to provide a valve assembly having packing removal means which can be actuated by rotating the valve stem.

Another object of the present invention is to provide a packing removal means for a valve assembly which can be easily incorporated into existing valve assemblies without modification to the valve body or bonnet.

Another object of the present invention is to provide a packing removal means for a valve assembly which is relatively simple in construction, and is easy to operate.

Another object of the present invention is to provide a packing removal means for a valve assembly to reduce the amount of time needed to replace the valve packing in a valve assembly.

Still another object of the present invention is to provide a packing removal means for a valve assembly which enables the valve packing to be removed without damaging the highly polished surfaces of the valve stem and the packing chamber.

Still another object of the present invention is to provide a packing removal means for a valve assembly which is relatively inexpensive to manufacture and is easily incorporated into existing valve assemblies.

DETAILED DESCRIPTION OF THE INVENTION

Figure 1:
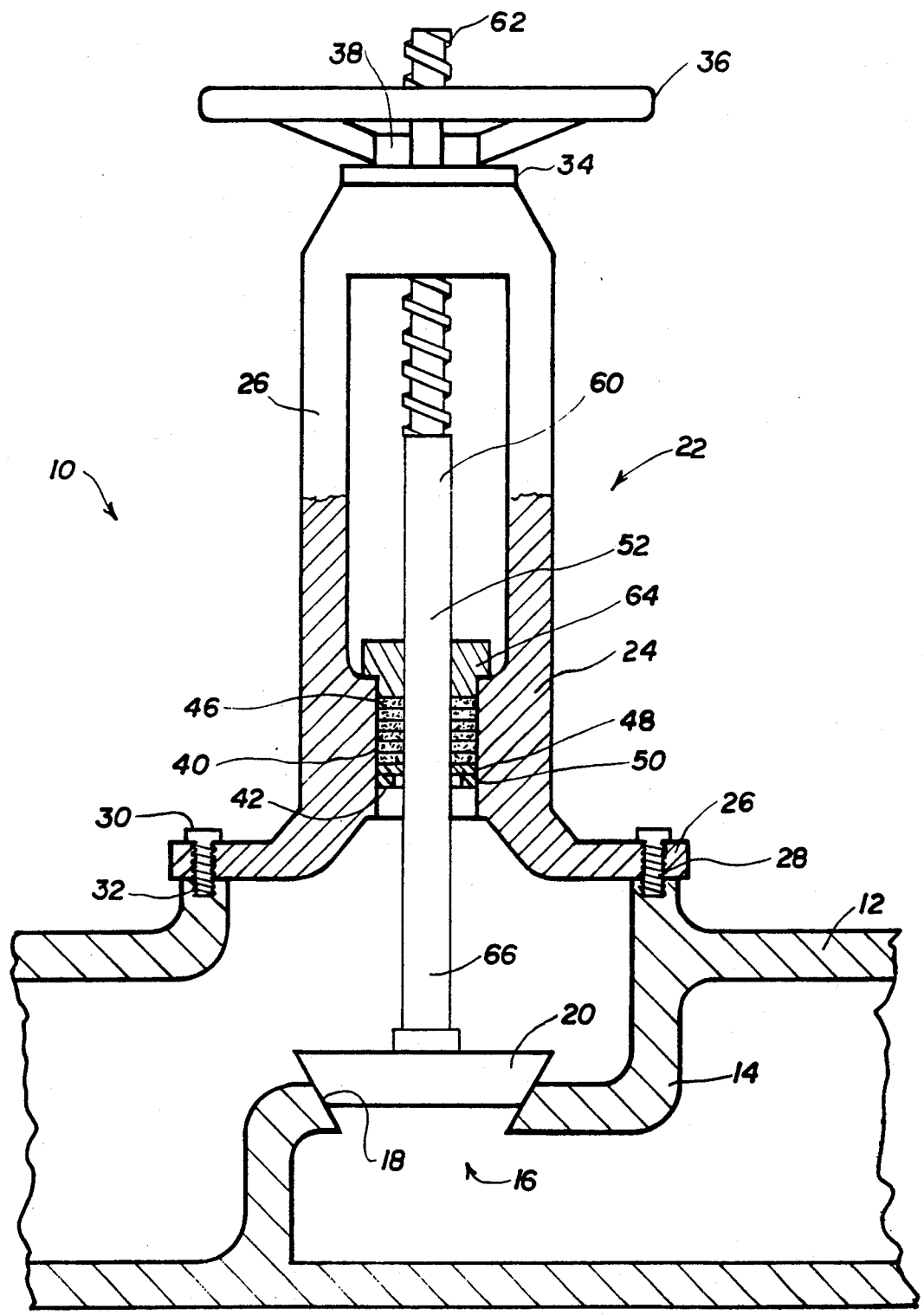
FIG. 1 is a side elevation view, with portions shown in section, of the valve assembly of the present invention.

Referring now to the drawings and particularly to FIG. 1, the valve assembly of the present invention is shown therein and indicated generally by the numeral 10. The valve assembly 10 includes a valve body 12 defining a fluid chamber. The fluid chamber is divided by a partition 14 having an opening 16 therein. The opening 16 is surrounded by a conical valve seat 18 which is formed in the partition 14. The valve seat is engageable with a valve 20 which is mounted at one end of a valve stem 60. When the valve stem 60 is lowered, the valve 20 is brought into engagement with the valve seat 18 to close the fluid chamber. Conversely, when the valve stem is raised, the valve 20 is brought out of engagement with the valve seat 18 thereby opening the fluid chamber.

A bonnet 22 is mounted on top of the valve body 12. The bonnet 22 includes a base portion 24 and a yoke 26. The base portion 24 includes an outwardly projecting flange 26 having a series of openings 28 formed therein. The bonnet 22 is secured to the valve body 12 by bolts 30 which pass through the openings 28 in the flange and threadably engage corresponding bolt holes 32 in the valve body 12.

The yoke 26 extends upwardly from the base portion 24 and has a bushing 34 mounted at the upper end thereof. A handcrank 36 is rotatably journalled in the bushing 34. The handcrank 36 includes a hub 38 having a threaded opening (not shown). An upper end portion 62 of the valve stem 60 is threadably engaged in the hub 38 of the handcrank 36. When the handcrank 36 is rotated in a counterclockwise direction, the valve stem 60 is raised thereby opening the valve 20. When the handcrank 36 is rotated in a clockwise direction, the valve stem 60 is lowered until the valve 20 makes contact with the valve seat 18.

A cylindrical packing chamber 40 is formed in the base portion 24 of the bonnet 22. The bottom 42 of the packing chamber 40 includes an opening 44 through which the valve stem 60 extends. The side walls of the opening 44 serve as a guide to keep the valve stem aligned. Valve packing 46 is disposed around the intermediate portion 64 of the valve stem 60 within the packing chamber 40. The valve packing 46 typically consists of several annular rings of packing material such as Grafoil ribbon, graphite impregnated asbestos fiber, wire reinforced packing rings, or other suitable materials. The entire packing assembly is held in the packing chamber by a packing gland 52. The packing gland 52 will typically include an apertured flange through which a pair of swing bolts mounted on the bonnet extend. Nuts are threaded onto the ends of the swing bolts to tighten the packing gland 52 down against the packing material 44. The construction of the packing gland 52 is entirely conventional and is well-known to those skilled in the art.

When the valve assembly 10 is in use, the valve packing 46 will become compressed and hardened. To keep the valve assembly 10 in good working order, it is necessary to periodically replace the valve packing. Replacement of the valve packing is usually done by unbolting and then lifting the packing gland 52 to expose the valve packing 46. Removal of the valve packing 46 usually requires the use of sharp instruments such as picks, scrapers and wire brushes which is not only time consuming and expensive, but can also damage the surfaces of the valve stem 60 and packing chamber 40.

To overcome these problems with the prior art, the present invention incorporates a self-contained, packing removal means. The packing removal means includes a radially displaceable lifting element for applying an upwardly directed force on the packing assembly when the valve stem is operated. The lifting element is normally contained within the valve stem when the valve is in use, so as not to interfere with the operation of the valve.

Figure 3:
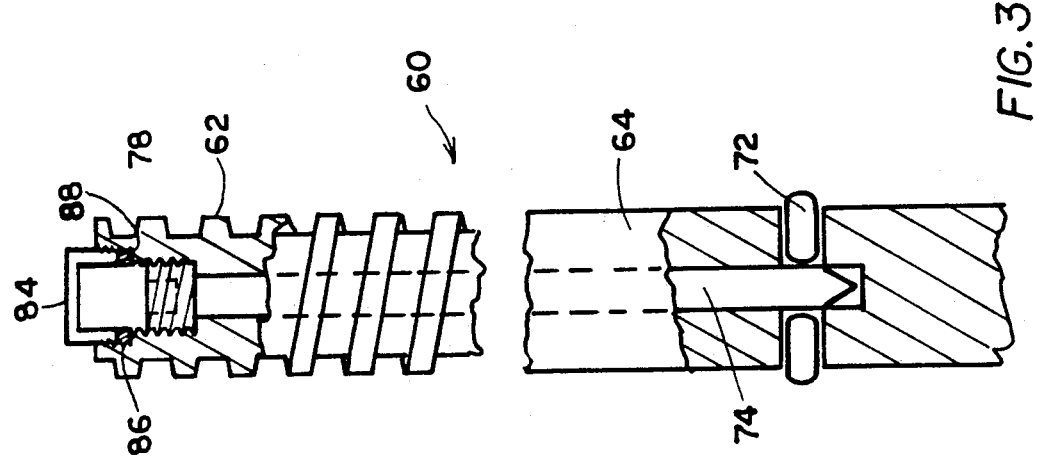
FIG. 3 is a partial elevation of the valve stem with portions shown in section, illustrating the packing removal means in an operative position.
Figure 2:
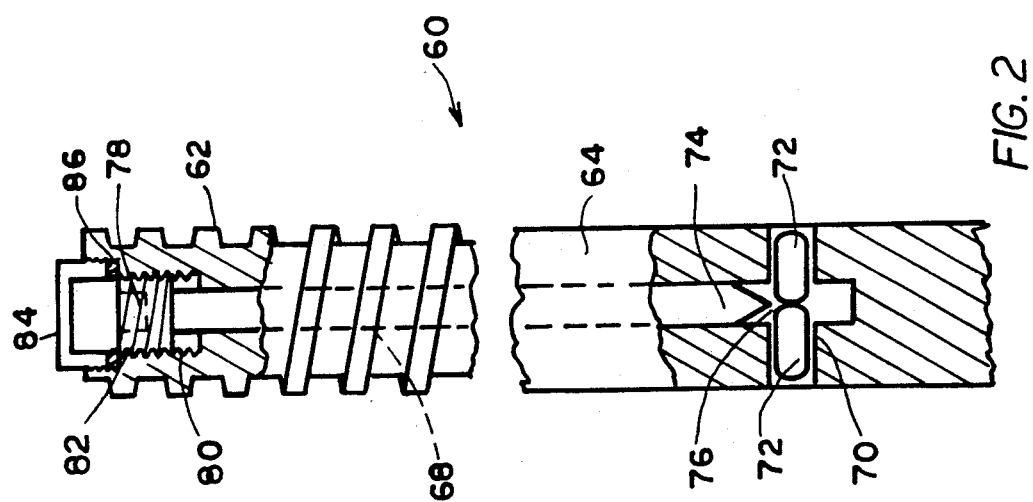
FIG. 2 is a partial elevation view of the valve stem, with portions shown in section, illustrating the packing removal means in an inoperative position.
Figure 5:
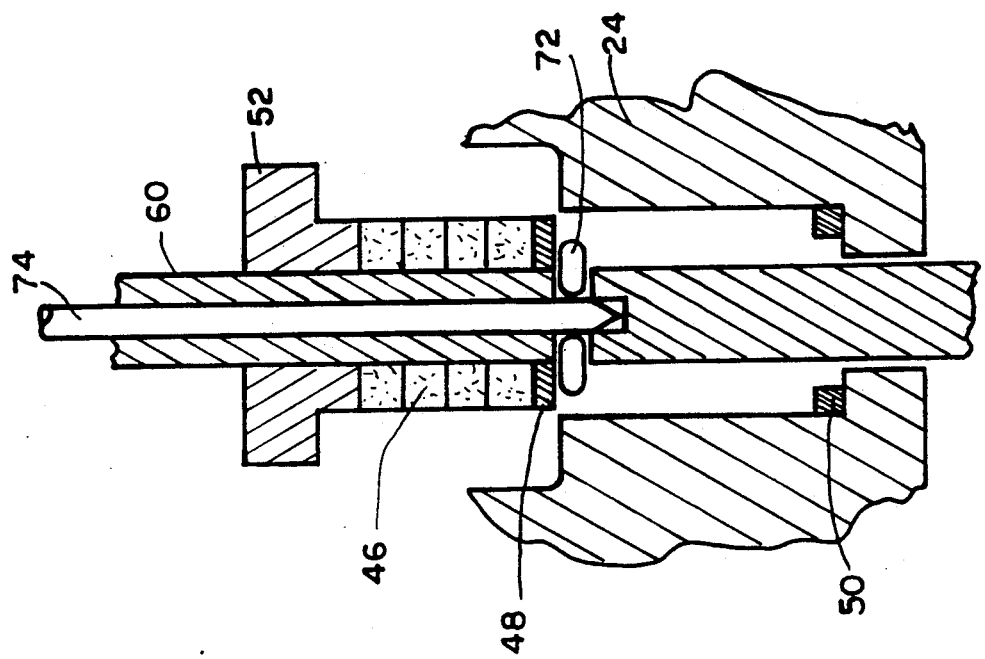
FIG. 5 is a partial section view of the valve assembly showing the valve packing being lifted from the packing chamber.

Referring now to FIGS. 2 and 3, the packing removal means of the present invention is shown in more detail. An axial bore 68 extends through the valve stem from the upper portion 62 to the intermediate portion 64. The lower end of the axial bore is intersected by a transverse bore 70. A pair of cylindrical lifting pins 72 are disposed in the transverse bore 70. The ends of the lifting pins are slightly rounded for reasons which will become apparent. The lifting pins 72 are normally in a retracted position as shown in FIG. 2. When it is desired to remove the valve packing 46, the lifting elements can be moved to an extended position as shown in FIG. 3. To move the lifting pins 72 to an extended position, an actuator rod extends downwardly through the axial bore 68. The actuator rod includes a wedging surface 76 which urges the lifting pins 72 radially outward when the actuator rod is moved axially downward. The actuator rod 74 includes a threaded upper end portion 78 which is engaged in a threaded counterbore 80 in the valve stem 60. The threaded portion 78 includes a hex socket 82 which is engageable with an Allen wrench.

To prevent fluid from leaking around the actuator rod 74, a stem cap 84 and stem seal 86 is secured in the top of the valve stem 60. More particularly, a landing 88 is formed in the upper end of the valve stem 60. The stem seal 86 rests on top of the landing 88 and the stem cap 84 screws down tightly against the stem seal 86. Also, an o-ring seal may, if desired, be inserted into a groove located on the actuator rod 74 as an additional measure of protection.

To move the lifting pins 72 from their normal retracted position to an extended position, the actuator rod 74 is screwed into the valve stem 60 from the position shown in FIG. 2 to the position shown in FIG. 3. As the actuator rod is screwed into the valve stem 60, the wedging surface 76 works itself between the lifting pins 72 and urges the lifting pins 72 radially outward as shown in FIG. 3. In the extended position, the lifting pins 72 engage a lifting ring 48 disposed around the stem 60 immediately below the valve packing 46. The lifting ring 48 serves to distribute the lifting force evenly to the bottom of the packing assembly. A spacer 50 is disposed in the packing chamber 40 below the lifting ring 48 to provide a space between the lifting ring 48 and the bottom 42 of the packing chamber 40 into which the lifting pins 72 extend.

Figure 4:
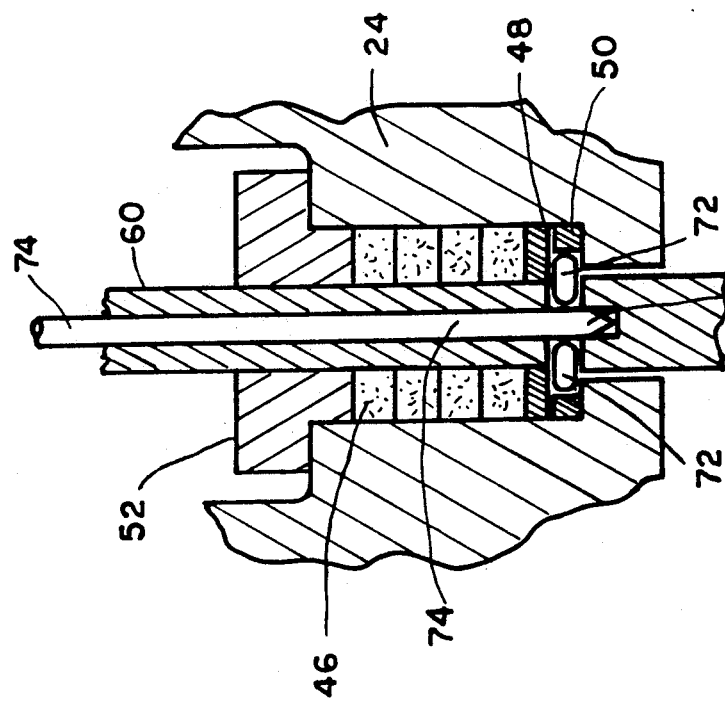
FIG. 4 is a partial section view of the valve assembly showing the packing disposed in the packing chamber and the packing removal means in an operative position.

To use the packing removal means of the present invention, the nuts retaining the packing gland 52 are first removed. After releasing the packing gland 52, an Allen wrench is used to rotate the actuator rod 74 clockwise. The rotation of the actuator rod 74 causes it to move axially downward between lifting pins 72 urging the lifting pins 72 to an extended position as shown in FIGS. 3 and 4. In the extended position, the lifting pins 72 extend into the space formed between the lifting ring 48, spacer 50, and the bottom 42 of the packing chamber 40. With the lifting pins 72 in an extended position, the handcrank 36 is turned clockwise to raise the valve stem 60. As the valve stem 60 is raised, the lifting pins 72 engage the underside of the lifting ring 48. The forceful engagement of the lifting pins 72 with the lifting ring 48 lifts the valve packing 46 out of the packing chamber 40. This process does not require any tools to remove the valve packing, other than the Allen wrench used to tighten the actuator rod 74.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A valve assembly including:
   a) a valve body defining a fluid chamber;
   b) a valve seat formed in the fluid chamber;
   c) a valve engageable with said valve seat to close the fluid chamber;
   d) a valve stem connected at one end to said valve member for supporting said valve member, said valve stem including an upper end portion, an intermediate portion, and a lower end portion;
   e) means for axially displacing said valve stem to selectively open and close said opening in the valve body by seating and unseating said valve member;
   f) a bonnet mounted on said valve body and including a packing chamber through which an intermediate portion of the valve stem extends;
   g) a removable valve packing assembly disposed in said packing chamber and around said valve stem to prevent fluid leakage around said valve stem, said valve packing assembly including one or more valve packing rings;
   h) packing removal means for removing said packing assembly without disassembly of the valve stem from the valve assembly, said packing removal means including:
      1) a radially displaccable lifting element disposed within said valve stem and movable between a retracted position in which said lifting element is retracted into said valve stem and an extended position in which said lifting element extends radially outward from said valve stem; and
      2) actuating means for moving said lifting element to the extended position, so that upon the raising of the valve stem, the lifting element engages said packing assembly from underneath and lifts the packing assembly upwardly from the packing chamber.

2. The valve assembly according to claim 1 wherein the lifting means includes a lifting ring disposed in the lower portion of the packing chamber beneath the valve packing, and wherein the lifting ring is engaged by the lifting element upon operation of the valve stem when the lifting element is in an extended position.

3. The valve assembly according to claim 1 wherein said lifting element comprises at least one lifting pin disposed in a transverse opening in the valve stem.

4. The valve assembly according to claim 3 wherein the transverse opening extends diametricaly through the valve stem and wherein said lifting element comprises a pair of lifting pins disposed in opposite ends of the transverse opening.

5. The valve assembly according to claim 3 wherein said actuating means comprises an actuator having a wedge surface for engaging the lifting pin and urging it to an extended position.

6. The valve assembly according to claim 5 wherein the valve stem has an axial bore which intersects the transverse opening, and wherein the actuator comprises an elongated rod axially movable in the axial bore of the valve stem.

7. The valve assembly according to claim 6 wherein the elongated rod has a conical end for engaging said lifting pin.

8. A valve actuator assembly for use in connection with a valve having a valve body with a fluid chamber and a valve means engageable with a valve seat in said fluid chamber, said valve actuator assembly comprising:
   a) a bonnet mountable on said valve body and including a packing chamber;
   b) a valve stem operatively connected with said valve means and supported by said bonnet, said valve stem including an intermediate portion extending through said packing chamber;
   c) means for axially raising and lowering said valve stem to selectively open and close said valve means;
   d) a valve packing assembly disposed in said packing chamber and circumposed around the intermediate portion of the valve stem to prevent fluid leakage around said valve stem; and
   e) packing removal means for removing said packing assembly without disassembly of the valve stem from the valve assembly, said packing removal means including:
      1) a radially displaceable lifting element disposed within said valve stem and movable between a retracted position in which said lifting element is retracted into said valve stem and an extended position in which said lifting element extends radially outward from said valve stem; and
      2) actuating means for moving said lifting element to the extended position, so that upon the raising of the valve stem, the lifting element engages said packing assembly from underneath and lifts the packing assembly upwardly from the packing chamber.

9. The valve assembly according to claim 8 wherein the lifting means includes a lifting ring disposed in the lower portion of the packing chamber beneath the valve packing, and wherein the lifting ring is engaged by the lifting element upon operation of the valve stem when the lifting element is in an extended position.

10. The valve assembly according to claim 8 wherein said lifting element comprises at least one lifting pin disposed in a transverse opening in the valve stem.

11. The valve assembly according to claim 8 wherein the transverse opening extends diametrically through the valve stem and wherein said lifting element comprises a pair of lifting pins disposed in opposite ends of the transverse opening.

12. The valve assembly according to claim 8 wherein said actuating means comprises an actuator having a wedge surface for engaging the lifting pin and urging it to an extended position.

13. The valve assembly according to claim 8 wherein the valve stem has an axial bore which intersects the transverse opening, and wherein the actuator comprises an elongated rod axially movable in the axial bore of the valve stem.

14. The valve assembly according to claim 8 wherein the elongated rod has a conical end for engaging said lifting pin.

15. A valve actuator assembly comprising:
 (a) a bonnet mountable on a valve body and including a packing chamber;
 (b) a valve stem supported by said bonnet and operatively connected to a valve disposed in said valve body, said valve stem including an intermediate portion extending through said packing chamber;
 (c) means for axially raising and lowering said valve stem to selectively open and close said valve;
 (d) a valve packing assembly disposed in said packing chamber to prevent fluid leakage around said valve stem;
 (e) packing removal means for removing said valve packing from said packing chamber when said valve stem is raised without disassembly of the valve stem from the valve actuator assembly, including:
  (1) a cavity formed within said valve stem;
  (2) a lifting element disposed within said cavity and movable between a retracted position during normal operation of said valve and an extended position; and
  (3) actuating means contained within said valve stem for engaging said lifting element and urging it to an extended position so that upon the raising of the valve stem, the packing assembly is engaged by the lifting element and bodily lifted from the packing chamber.

16. The valve assembly according to claim 15 wherein the lifting means includes a lifting ring disposed in the lower portion of the packing chamber beneath the valve packing, and wherein the lifting ring is engaged by the lifting element upon operation of the valve stem when the lifting element is in an extended position.

17. The valve actuator according to claim 15 wherein said actuator comprises an elongated rod extending through an axial bore in said valve stem, said rod being axially movable within said axial bore.

* * * * *